April 25, 1950     C. F. HOFFMANN     2,505,117
COOKING OVEN
Filed Feb. 28, 1946     2 Sheets-Sheet 1
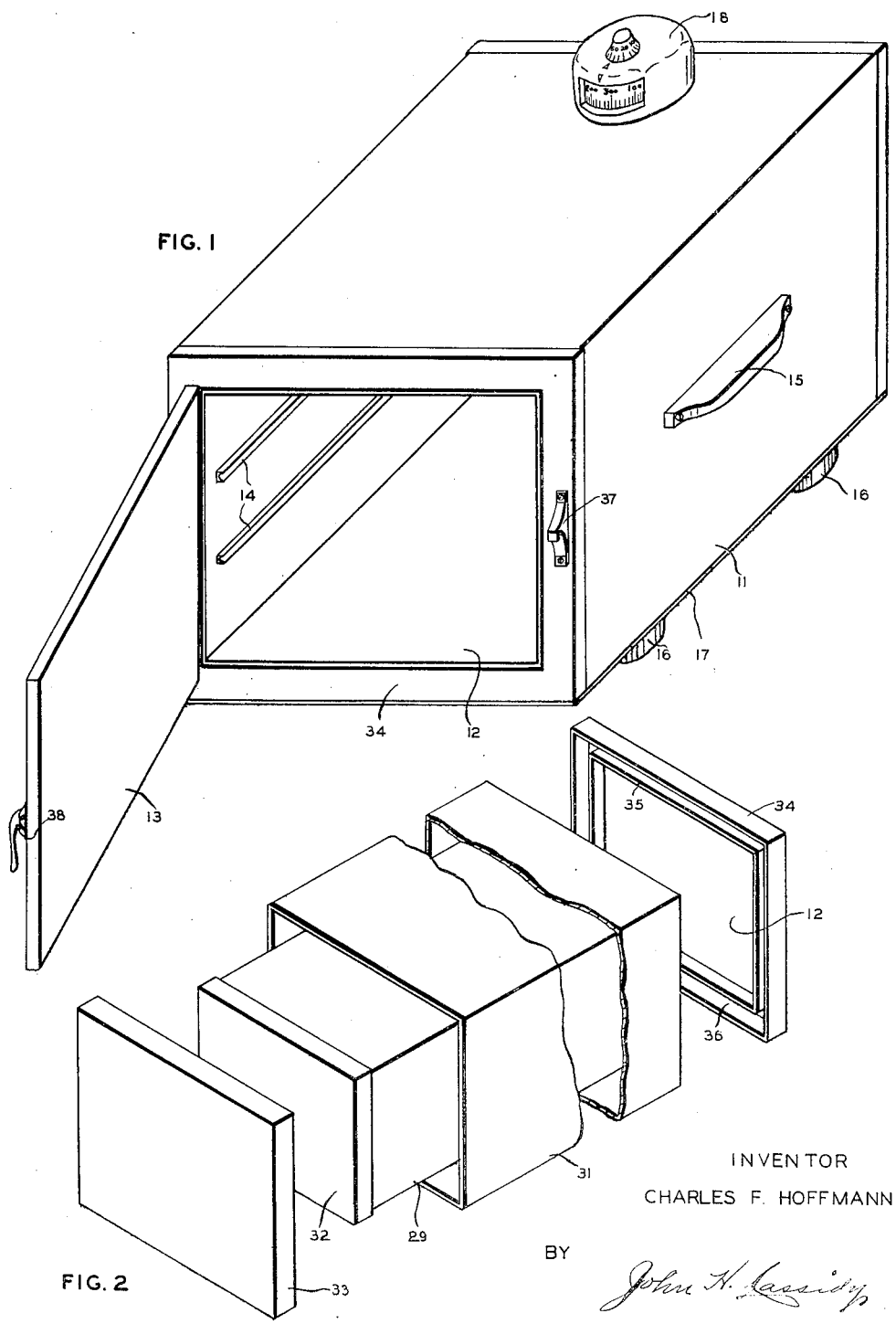
INVENTOR
CHARLES F. HOFFMANN
BY
John H. Cassidy
ATTORNEY April 25, 1950     C. F. HOFFMANN     2,505,117
COOKING OVEN Filed Feb. 28, 1946     2 Sheets-Sheet 2

INVENTOR
CHARLES F. HOFFMAN
BY John H. Cassidy
ATTORNEY

Patented Apr. 25, 1950

2,505,117

UNITED STATES PATENT OFFICE 2,505,117

COOKING OVEN

Charles F. Hoffmann, Crawford County, Mo.

Application February 28, 1946, Serial No. 650,796

1 Claim. (Cl. 219—35)

This invention pertains to electrical heating devices generally and concerns itself more particularly with domestic cooking ovens.

Although to a somewhat less degree in the case of electric ranges, it is a well known fact that none of the ovens of our present day domestic ranges provide uniform heat distribution or heat application to the foods which they process.

Solid fuel stoves, although designed to conduct heated gases to the bottom, top, sides, and one end of their ovens, represent the type hardest to control since their oven temperatures are entirely dependent upon uniform firing, a condition which is practically impossible to obtain. Moreover, since the fire box of these stoves is usually to one side of the oven, one of its sides receives the hot gases first and uneven heat distribution results, both inside and out of the oven.

The heat applied to the oven of oil or gas ranges, on the other hand, can be maintained much more uniform than that for the solid fuel type stove, but the problem of heat distribution is just as pronounced. Usually, in this type of stove, the heat for the oven is produced by burners located underneath the oven. Since oxidation of the fuel requires that the burner chamber be open and since the hot gases from the burners must be admitted to the oven through vents, the oven cannot be completely closed and insulated, and uniform distribution of heat within it cannot be had.

In the modern electric range, the problem of closing and insulating an oven has been solved. Since heat energy is supplied through wires whose points of entry into the oven may be completely sealed, the heating unit may be self-contained and the chamber completely closed and insulated. Here the heating unit, comprising a resistance coil, is usually mounted on the underside of a metallic plate which is supported for a small distance above the bottom of the oven. Under this arrangement heat is applied to the foods processed in the oven by convection, primarily, since the plate on which the resistance coil is wound provides a screen for heat radiations. Further, since the food receptacle is usually supported on grates carried above the heat element plate, it receives no heat by conduction, and very little by radiation.

In this type of oven, which is representative of the prior art design, convection heat is relied upon almost entirely for the processing of the food, and while it is greatly superior to either the solid fuel type or the oil or gas types, its very accurate heat control has been responsible to a very large degree for neglecting the important factor of uniform heat application to the food itself with the result that optimum processing effects have not been reached. Accordingly, it is the principal object of this invention to provide a cooking oven in which heat applications to food to be processed therein may be made uniformly.

Another object of the invention is to provide a cooking oven by means of which foods may be processed by radiant energy emanating from a plurality of the surfaces forming the oven enclosure.

It is also an object of the invention to provide a portable electric oven having the windings of its heating unit so distributed within its walls as to provide uniform heat applications to the foods which are processed therein.

More specifically, it is an object of the invention to provide an electric oven in which the heating element thereof is of the closed type, having portions of its continuous resistance element distributed within the bottom, top and side walls of the oven in a substantially fixed ratio providing for the uniform application of heat to foods to be processed in the oven.

It is a further object of the invention to provide a portable electric oven of the cabinet type which may be conveniently stored within the oven chamber of a standard domestic range.

It is a still further object of the invention to provide an electric cooking oven so dimensioned as to provide for maximum heat application to the foods processed therein, resulting in a greater over all efficiency than is presently obtainable in the prior art devices.

Yet another object of the invention is to provide an electric cooking oven which will carry out the foregoing objects of the invention with a minimum amount of power input, which is economical to construct, and which is rapid in its operation.

Other objects and advantages will become apparent as the description proceeds and a more comprehensive understanding of the invention will be afforded from the following detailed specification when considered in conjunction with the accompanying drawings, in which Fig. 1 is a view of an electric oven embodying the instant invention, Fig. 2 is an exploded perspective view thereof showing an arrangement of the parts forming the oven enclosure.

Figure 3:
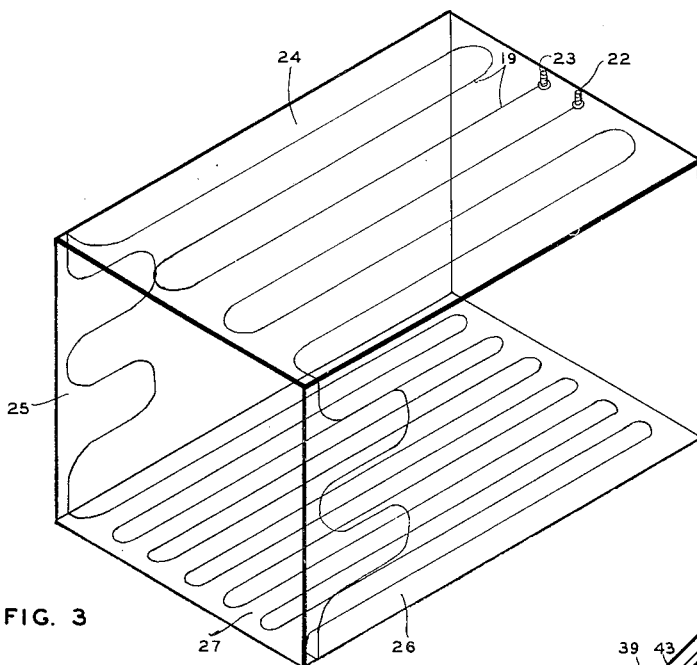
Fig. 3 is a schematic distribution diagram of a heating unit employed in the instant invention showing its linear dispersion within the walls of the oven.
Figure 5:
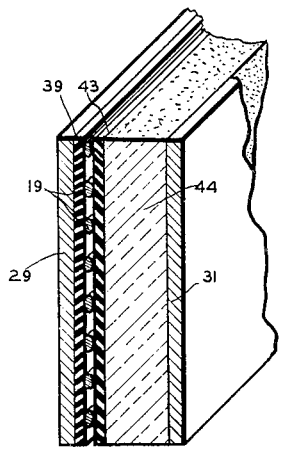
Fig. 5 is a cross sectional detail view showing the construction of the oven walls.
Figure 4:
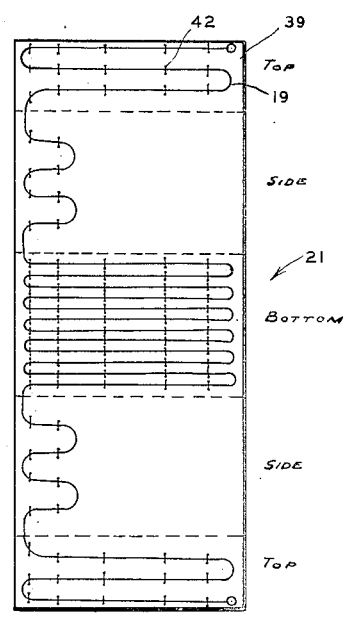
Fig. 4 is an unfolded view of the oven's heating element showing the same mounted to a strip of non-conducting material by means of which it may be accurately positioned in the oven.

In its preferred embodiment, the invention contemplates an oven cabinet 11 which is illustrated in Fig. 1 as being rectangular in shape and which is provided at one of its ends with an opening 12 covered by a hinged door 13. Each of the two side walls of the cabinet are provided on the inside with brackets 14 into which grates may be inserted to support containers of food. On the external side walls of the oven, a pair of handles 15 are mounted to enhance its portability, and the oven is supported on four legs 16, two of which are shown in the figure. A heat insulating plate 17 is fixed to the bottom of the oven, also, for protecting table surfaces, or the like on which the oven may be placed, against injury from heat. For regulating the amount of heat admitted to the oven, a standard adjustable heat control unit 18, which may take any desirable form, is also provided.

An essential feature of the oven resides in the distribution of a continuous resistance wire 19 forming a part of the oven's heating element 21. The ends of this resistance element, which may take the form of a flat strip of chrome-nickel alloy, are connected to a pair of terminals 22 and 23 which receive electric energy from the control unit 18 in accordance with its adjustable setting.

The strip of the metal alloy 19 is distributed in a top wall 24, two side walls 25 and 26, and the bottom wall 27 of the oven substantially as illustrated in Fig. 3. Here it will be noted that a preponderance of the linear extent of the heating element is arranged in the bottom of the oven, a somewhat lesser amount in the top wall 24, and a still lesser amount in each of the said walls 25 and 26. It will also be noted that while the heat element is distributed substantially evenly over the entire bottom and top areas, the portions carried in the side walls are arranged at one end of the oven near the door. In this latter case, it is intended that the concentration of the winding of the heating element near the door will provide for heat losses around the door.

Although it is not intended to limit the invention to any particular construction, the oven contemplated is made up of an inner shell 29 which is preferably fabricated from sheet metal. Surrounding the shell 29 is an outer casing 31 and between these two structures the heating element 21 is placed. One end of the shell 29 is closed by an end piece 32, and between this piece and a similar end panel 33, closing the outer casing 31, is packed an insulating material as will be described. A door frame 34 having an internally disposed flange 35 retains an insulating material in a channel 36 passing completely around the opening 12 and closes the door end of the space between the shell 29 and the outer casing 31. All of the cabinet parts may be joined by any suitable process, such as spot welding, and heat insulators may be employed to hold the inner shell in spaced relationship with the outer casing 31. Also, the opening 12 is closed by the door 13 which is hinged to the frame 34, and which is held tightly against the face of the frame by a latch 37 fixed thereto for the reception of a bolt 38 carried on the door.

The heating element 21 is made up of a non-conducting sheet 39 to which the resistance strip 19 is attached by suitable fasteners 42. The sheet 39 is preferably asbestos, though other materials, such as mica, may be used. This construction makes possible the accurate distribution of the wire 19 within the walls of the oven and also provides for its ready installation since all that is required is that the sheet be wrapped around the inner shell 29 with the wire 19 on the outside. Next, a second sheet of asbestos 43 is placed around the heating element 21 and the remainder of the void space between the inner shell 29 and the outer casing 31 is filled with an insulating material 44 such as rock wool, spun glass, or the like. The end walls of the oven contain no part of the heating element wire 19 and accordingly they are filled with the insulating material 44, only. The door 13 is also fully insulated.

While the theory upon which the success of an oven built in conformity with the teaching of the instant invention is not known, it is believed to embrace the linear distribution of the heating wire within the walls of the oven which provides for an even application of radiant heat to the food cooked. Although no limitation as to the size of the oven, the length of the heating wire or their relationship with each other, is intended, a successful device has been made having internal dimensions of approximately 10 inches high, 11 inches wide, and 12 inches deep, with walls approximately 1½ inches thick. In this particular oven, a resistance wire having a total length of 20 feet is distributed in the top, bottom and side walls thereof in the following manner: 132 inches in the bottom, 60 inches in the top and 24 inches in each of the sides.

In one aspect this invention contemplates the use of a relatively large application of heat at the bottom and a relatively small amount at the top of the oven. This is accomplished in the embodiment illustrated and described by using substantially half the length of resistance wire on the top as is used on the bottom. This relationship has been found in actual practice to secure the uniformity that is ideally required in baking and roasting. It is believed that approximately this relationship holds good within the range of sizes in which kitchen ovens are made. Expressing the relationship in a different manner, sufficient heat is applied by auxiliary heating elements appropriately proportioned at the top with relation to a major heat application at the bottom to equalize the temperature throughout the oven, whereby uniformity of cooking is obtained. For example, in a pastry, uniformity of crust is obtained, as contrasted with a condition in which the bottom is overcooked while the top is not sufficiently browned.

In another aspect of the invention, means are provided, comprising heating elements along the side walls of the oven but concentrated near the oven door to compensate for heat losses around the door. It will be obvious that the required proportion of heating elements so positioned with reference to the heating elements at the top and bottom will depend upon the particular physical structure of the oven door and its fit with the opening. Excellent design and workmanship may provide a door having a fit which will prevent substantial heat losses so that such heating elements may be eliminated altogether, but for ordinary commercial structures of a design such as is illustrated and with a reasonably close fit for the door, the ratio of distribution of the resistance wire given in the specific example above obtains the desired results.

It has been found that in addition to the more excellent roasting and baking secured by this invention, important advantages of time and economy are secured. Better baking can be done in less time and at lower temperatures than with conventional electric ovens. From the standpoint of economy of operation less current is used and for a lesser period of time.

What is claimed is:

In an electric cooking oven having a cooking compartment formed by a top wall, a bottom wall, an end wall, two side walls and a door, a first heating element contained in said bottom wall, a second heating element in said top wall and third and fourth heating elements contained respectively in said two side walls, all of said heating elements being of the resistance wire type and having wattage in their respective order of mention, as expressed in percentage of their total combined wattage, of approximately 55, 25, 10 and 10, with the first and second heating elements distributed substantially evenly over the area of the wall in which each is contained, and with the wattage of each of the third and fourth elements concentrated at one end of the compartment near the door.

CHARLES F. HOFFMANN.

REFERENCES CITED

The following references are of record in the file of this patent:

UNITED STATES PATENTS

| Number | Name | Date |
| --- | --- | --- |
| 1,056,933 | Perkinss | Mar. 25, 1913 |
| 1,119,579 | Detwiler | Dec. 1, 1914 |
| 1,213,595 | Deal | Jan. 23, 1917 |
| 1,721,582 | Ziola | July 23, 1929 |
| 1,818,789 | Campbell | Aug. 11, 1931 |
| 2,055,246 | Bradbury | Sept. 22, 1936 |
| 2,266,901 | Parsons | Dec. 23, 1941 |
| 2,415,768 | Shaw | Feb. 11, 1947 |